Nov. 2, 1937.  C. M. HOWELL  2,097,793
MEANS FOR COOKING
Filed July 9, 1934  2 Sheets-Sheet 1
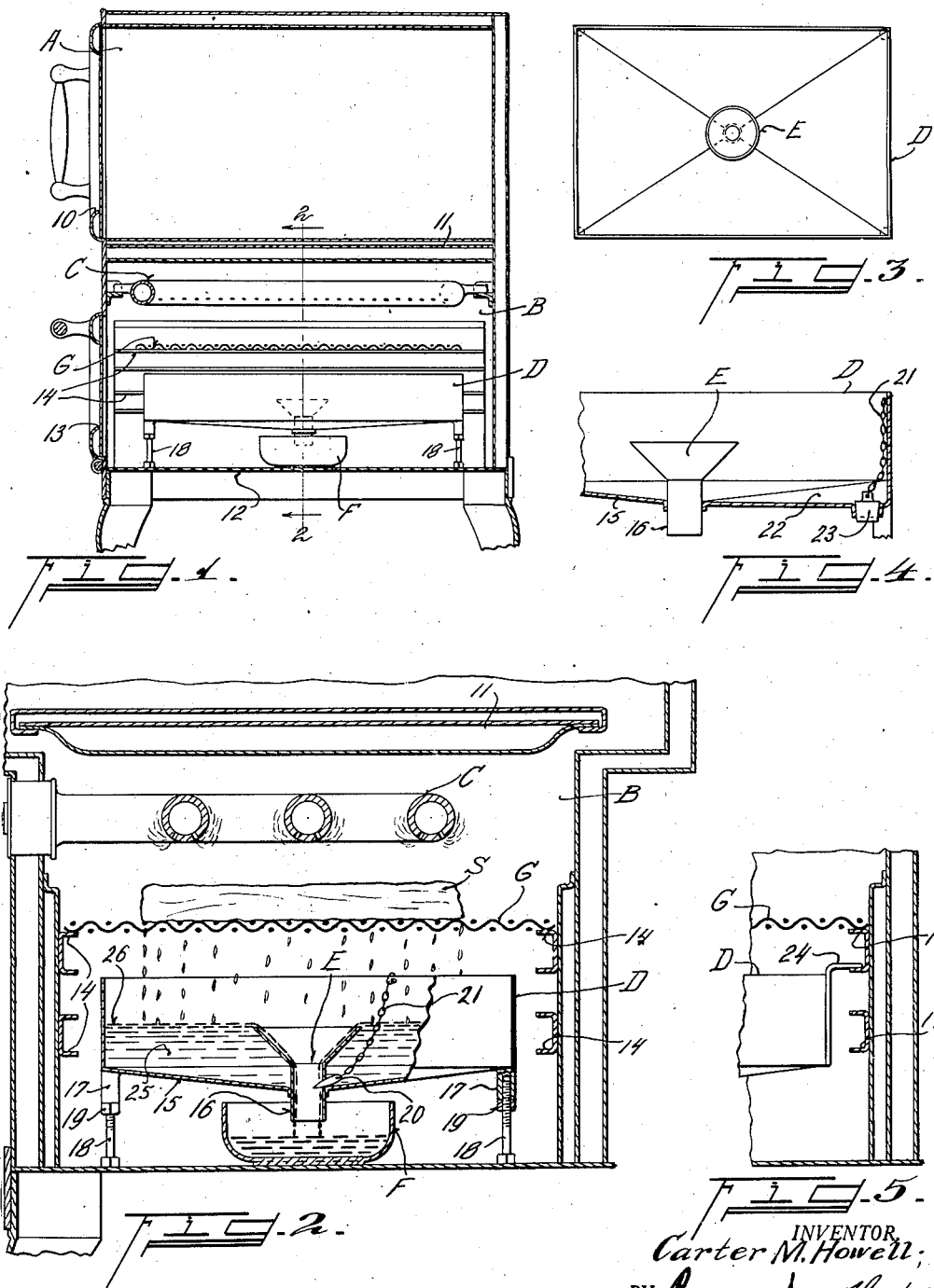
INVENTOR
Carter M. Howell;
BY
ATTORNEY.

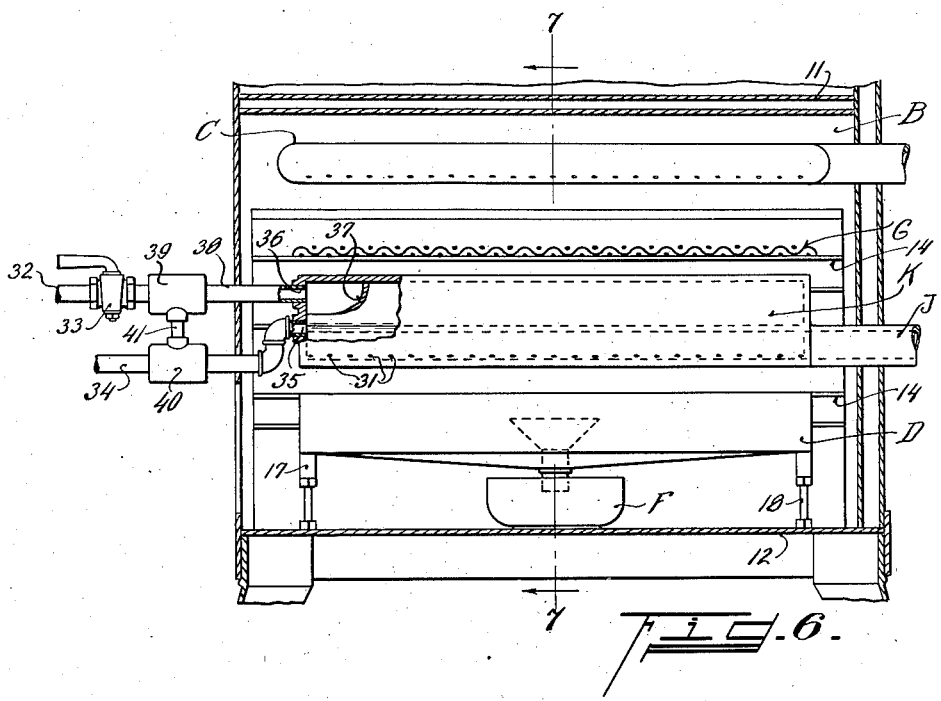
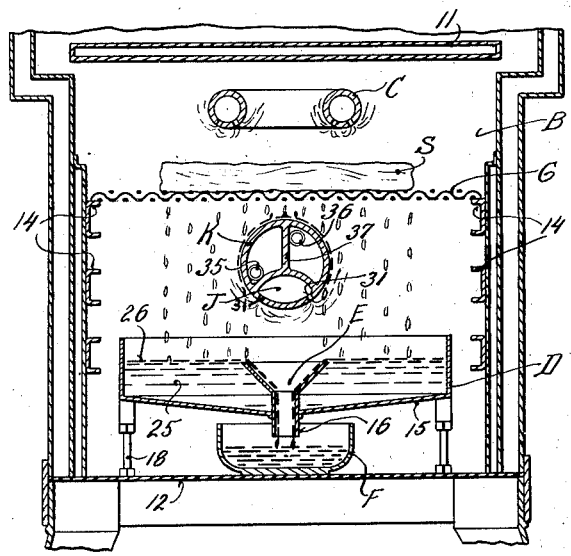

Patented Nov. 2, 1937

2,097,793

UNITED STATES PATENT OFFICE 2,097,793

MEANS FOR COOKING

Carter M. Howell, Los Angeles, Calif.

Application July 9, 1934, Serial No. 734,304

2 Claims. (Cl. 126—41)

This invention relates to improvements in means and methods of cooking, more particularly that manner of cooking denominated "broiling".

As is well known, many articles of food are best cooked by exposing them to a near-by source of heat, so that by radiation and convection, the food is raised to an appropriate temperature and so maintained until the cooking is finished.

While a favorite method of cooking, due both to the convenience and the better flavor usually derived from foodstuffs cooked in this manner, broiling generally causes excessive quantities of fumes and smoke and, frequently, in cooking meats in this manner, greases, either derived from the food or applied, catch on fire, burning the meat or foodstuff and rendering the greases and juices unfit for later use, and which are usually collected in some convenient manner as broiling proceeds, for preparing dressings and gravies. Hence, broiling foods requires a certain amount of skill; cannot be done at a rapid rate or near too hot a heat source, and requires continual watchfulness and attention, so that a cook cannot attend to other duties while broiling foods.

Also, as broiling is usually done, only one surface of the food is exposed to the heat source, which requires that the food be repeatedly turned over on its support to successively expose the two sides of the food to the heat, which operation causes loss of greases and juices; cools the food chamber somewhat during the turning, and prolongs the time of cooking.

Among the objects of this invention are: to provide means for preventing smoke and fumes in broiling; to collect the natural juices and greases extracted from foodstuffs being cooked without subjecting them to undue or over-heating; to prevent ignition or combustion of said greases or of the food itself while being cooked; to relieve the procedure of broiling from the discomfort attendant on fumes and smoke due to ignition of greases and food; to add hot moisture to the atmosphere surrounding the food, during broiling and thereby to prevent dryness of broiled food, and also prevent ignition of the food and propagation of combustion thereof; to eliminate the necessity of constant watchfulness and care in broiling and thereby enable cooks to perform other duties while food is being broiled; to reduce the time of broiling by ability to employ a hotter heat source, without danger of ignition of the food; to prevent carbonization of the foodstuff when the temperature of the heat source is excessive; all of which conditions are more particularly present when the heat source is an open flame, as in a gas stove; to provide a plurality of heat sources arranged to apply heat simultaneously to both sides of the food; to prevent the parts of an under heat source from becoming heated enough to ignite the greases and to limit and regulate the temperature of metal parts underneath the food, thus preventing ignition of greases falling on such parts; accelerating the speed of cooking and avoiding frequent turning over of the food to expose the surfaces successively to a single heat source.

Further objects are: to provide means for accomplishing these several objects which are simple, inexpensive, easily manipulated and cleansed and applicable to nearly every standard form of cooking appliance, and which may be partly automatic in their operation.

Other objects will appear as this description proceeds.

With the foregoing and other objects in view, the invention consists in the novel and useful formation, construction, interrelation and combination of parts, members and features, as well as mode and methods of use thereof, and steps and performances taken and had, all as hereinafter described, shown in the drawings and finally pointed out in claims.

In the drawings:

Fig. 1 shows a front elevation partly in section of a usual form of gas stove equipped with one form of this appliance;

Fig. 2 shows a fragmentary portion of a standard type of gas stove in section, including the broiling compartment with this appliance in place therein, a portion whereof is broken away, drawn to an enlarged scale, same showing manner of use;

Fig. 3 is a plan view of one form of the device;

Fig. 4 shows a fragmentary elevation of the device in section, showing a drain plug positioned adjacent one corner thereof;

Fig. 5 shows a fragmentary front elevation of the broiler portion of a gas stove with a modified form of support;

Fig. 6 shows a front elevation, in section, of a usual form of gas stove equipped with an additional heat source and control parts and equipped with a form of this device; and Fig. 7 is a section on line 7—7 in Fig. 6 of same.

In the figures, A represents the oven portion of a stove usually above the heat element C. B is the broiler compartment, G is the broiler or food support, which is a flat, foraminous sheet, usually of wire mesh or the like, positioned below and near the heat element C, which broiler G is usually supported at its ends by resting on members 14, which project inwardly from the compartment sides; 13 is the door of broiler compartment B. The walls of the stove are usually double, the two surfaces being spaced apart as indicated. Between the broiler compartment and the oven is a horizontal partition 11, as shown.

The device for improving broiling where the usual single source only of heat is employed is shown at D. It comprises a shallow vessel having a tubular member 16 which passes through the vessel bottom 15. The upper end of tube 16 is preferably expanded to form a hollow cone E. The upper edge of member E is lower than the edge of the vessel. Preferably tubular member 16 extends a short distance below the bottom of vessel D. The periphery of the upper edge of cone E is greater than that of the tubular portion 16. The bottom, 15, of the vessel is sloped toward the center of tube 16. The vessel may be supported on legs 18, which are threaded and screw into tapped holes in bosses 17, one whereof is shown in section in Fig. 2. This arrangement provides for vertical adjustment of the position of vessel D, the parts being set by locknuts 19. A drain hole having plug 20 with draw chain 21 is provided, by which the vessel D may be drained.

In use, plug 20 is inserted into the opening through tube 16, the vessel is partly filled with water until the liquid surface is very near the level of the upper edge of member E. The vessel is then placed directly under the broiler G. The object to be cooked, as S, is placed on the broiler just under the heat source C. A catch vessel, of convenient form, F, is placed underneath the lower end of tube 16. The heat drives the greases and juices from object S and also evaporates some of the water 25 in vessel D at a very slow rate, so that a slight quantity of steam rises up to the object S being broiled. The greases fall into vessel D and float on the water 25, forming a thin layer 26 as shown. This layer will run over the upper edge of cone E to be caught in lower vessel F. No considerable accumulation of grease is possible as it is continually drained to the catch-vessel F below. Both ignition and charring are prevented by the moist atmosphere derived from the slight evaporation of the water, which moisture also keeps the food from becoming dry. The layer of grease is automatically kept very thin, and, with a water surface below it, ignition is impossible from a heat source not in actual contact with the grease. None of the food greases and juices are lost, and by this arrangement constant attention and care, now essential in broiling, are eliminated. Only occasional inspection and turning of the food, to successively expose the two sides of an object being broiled, are necessary, so that a cook can attend to the preparation and cooking of other foodstuffs while broiling proceeds.

The water 25, may have its level adjusted or completely drained by manipulation of plug 20, the water drained passing through tube 16. Or, if desired, the drain hole and plug may be placed at a front corner of the vessel as indicated in Fig. 4, in which 23 is the plug having control chain 21. The bottom 15 of the vessel is depressed to drain to the plugged corner, as indicated at 22. The vessel D may be supported under and near the broiler G in any convenient manner, as, for example, by providing side lugs or a horizontally-bent edge 24 to rest on one of the several parallel pan and broiler supports 14 usual in gas and other cook stoves. This means of support is indicated in Fig. 5.

In this method of cooking there is an arrangement of the parts in layers or horizontal zones which are, successively, from top to bottom,— heat source; foodstuff; broiler plate, supporting foodstuff; grease layer; and water layer; which order of arrangement produces the superior results set forth under the list of objects of the invention.

Referring to the double heat source arrangement for broiling, as more specifically shown in Figs. 6 and 7, the parts of upper heat source, support, foodstuff and water-bath, with automatic skimming, are all as previously shown and described. Added to these elements are the under heat source, suitable for gas fuel, and means to prevent the metal parts thereof from becoming hot enough to scorch or ignite grease falling on it from the food S above, which second heat source and parts are interposed between the food support and the water vessel grease collector, as shown.

The lower heat source for gas fuel is preferably composed of a gas conduit J partly surrounded by jacket chamber K. Although shown as a single integral member, it could be made of a large tube surrounding a smaller one, the two being related in any convenient manner, it being only necessary that a space be provided between the upper elements of passages J and K so that a layer of water or other liquid may be interposed between these parts. Small holes 31, which enter gas conduit J and similar to the usual perforations in tubes for gas flames, are formed in the lower elements of the gas conduit J, so that when gas flows through them and is ignited the number of small flames will all be projected downward, then will turn upward around portion K and provide heat which will reach the under side of food S. Admission of water through intake pipe 32, control cock 33 and connection 38 to chamber K, will provide a water jacket to cool the upper portion of chamber K. Pipe 34, entering chamber K at 35, is a drain, so that water can be circulated through the water jacket. The water will maintain the outer surface of jacket K at a temperature below that of grease ignition. In this way, greases which fall from cooking food S will either drop through the flame of the lower heat source or fall on jacket surface K. If it drops through the flame it will pass through too quickly to become ignited. If it should be ignited, it will fall in the water bath 25 below, and be extinguished before being damaged. If the grease falls on the outer surface of K, it will not burn, because this surface is not hot enough; so the grease will roll off of this surface and drop down into the bath 25.

By regulating cock 33 the quantity of water passing through jacket chamber K, and, therefore, its temperature, may be regulated. Or, if desired, a thermostat 40 through which the discharged hot water passes, may be set for some predetermined temperature and arranged, by connector 41, to control admission valve 39 and thereby automatically fix the temperature of the water in the jacket, hence that of chamber K.

Obviously by this arrangement the food S may be cooked in about one-half the usual time of broiling and need not be frequently turned over to expose first one, then the other side to a single heat source. Also, the hot water discharged from the jacket K is generally useful in every kitchen. Incidentally, a baffle 37 may be used to insure passage of cold water to every open part of the water jacket.

The purposes and operation of water receptacle D as described are the same whether the single or double broiler be used.

With this construction, the order of the parts in layers from top to bottom become: upper heat source; foodstuff support; lower heat source; grease layer and water layer.

Having described my invention in connection with illustrative embodiments, forms, proportions and arrangements of parts, it will be understood that many variants thereof are possible to those skilled in the art, and my invention, in its broader aspects, is not limited to the specific construction herein described and shown, as changes in the sizes, proportions, configurations, arrangements, assemblage, interaction, juxtaposition and mechanical relations, as well as additions, omissions, substitutions, combinations and alterations of forms, parts, members and features may be made without departing from the broad spirit of this invention.

Having thus disclosed my invention, I desire to secure by Letters Patent the following claims:

1. Means for cooking food comprising a heating element, means for supporting food above said heating element, means providing a casing above and integral with said heating element, and means for the circulation of a coooling medium through said casing, whereby greases falling from the food toward the heating element are intercepted by said casing and whereby said casing may be maintained at a relatively low temperature so that greases falling thereon and flowing thereover will not readily ignite.

2. Means for cooking food comprising a heating element, means for supporting food above said heating element, means providing a casing above and in direct heat exchange relationship to said heating element, and means for the circulation of a cooling medium through said casing, whereby greases falling from the food toward the heating element are intercepted by said casing and whereby said casing may be maintained at a relatively low temperature so that greases falling thereon and flowing thereover will not readily ignite.

CARTER M. HOWELL.